Jan. 20, 1948.    C. B. KLUPPEL    2,434,659
CRANKSHAFT MOUNTING
Filed April 23, 1946

INVENTOR.
CLEMENT B. KLUPPEL
BY Frank R. Higley
ATTORNEY

Patented Jan. 20, 1948

2,434,659

UNITED STATES PATENT OFFICE 2,434,659

CRANKSHAFT MOUNTING

Clement B. Kluppel, Houston, Tex., assignor to Clark Bros. Co., Inc., Olean, N. Y., a corporation of New York Application April 23, 1946, Serial No. 664,384

5 Claims. (Cl. 308—189)

This invention relates to means for bearing the crankshaft of an engine or pump in the side frame member thereof.

More particularly, the invention contemplates as its principal object, removable and improved securement of the bearing means in such a machine by means wherein a clamping effect is had by wedge means upon a bearing member, in addition to the usual bolts heretofore employed, to eliminate all lost motion whatever at the location of securement, so that the reversal of loading forces inherent to a machine of this type will not effect ultimate looseness; the invention being particularly applicable to large heavy duty machines such as mud and slush pumps employed in petroleum fields.

Figure 1:
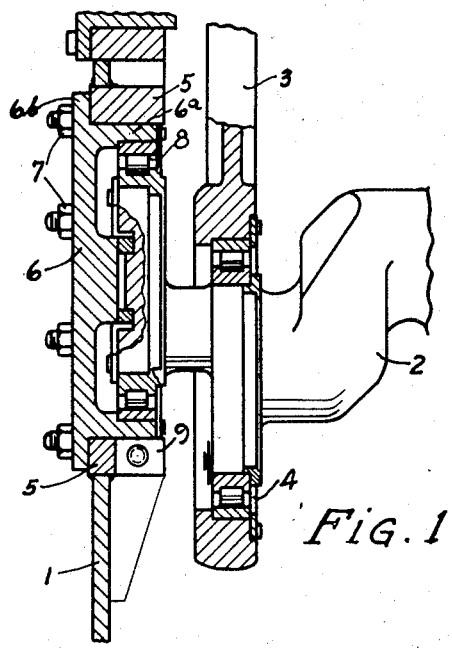
Figure 2:
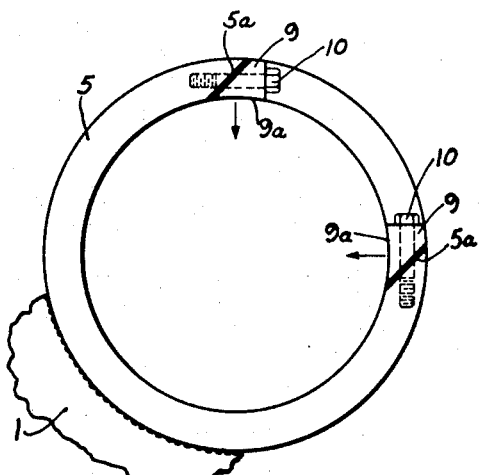
Figure 3:
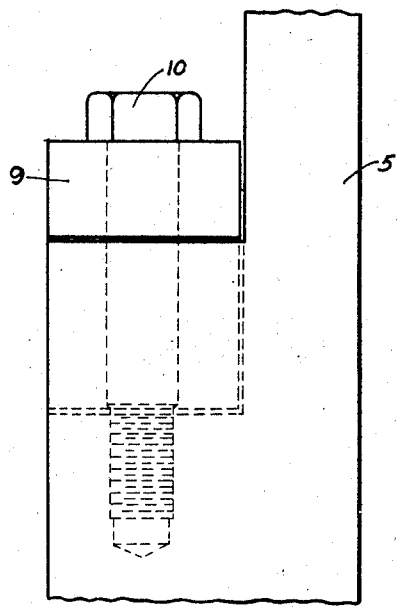
Figure 4:
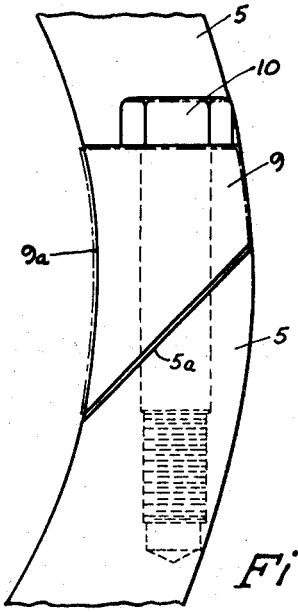

Further objects and advantages will be apparent from the following description taken in connection with the accompanying drawings wherein Fig. 1 is a view generally in typical section showing an assembly of pertinent features illustrative of the invention, Fig. 2 is a side elevation of some of the parts appearing in Fig. 1 and Figs. 3 and 4 are enlarged details of portions of the principal part appearing in Fig. 2.

With reference now to the drawings, 1 is a side frame member of a slush pump of which 2 is the crankshaft and 3 a connecting rod driven by one of the cranks of the crankshaft thru a roller bearing generally indicated at 4.

The crankshaft 2 is removably mounted in the side frame member 1 to have main bearing therein by the following means.

A base member 5 generally of ring form is rigidly and permanently associated with the side frame member as by welding thereto. A bearing member 6 which constitutes the main bearing housing has a cylindrical portion 6a fitting within the circular opening of the member 5, a peripheral flange 6b secured thereto as by spaced bolts 7, the outer part of the housing being continuous within the flange part 6b so as to form a continuation of the side frame member 1 for protection of the working parts therewithin.

The crankshaft bearing proper is of roller type indicated generally at 8 and as indicated, constitutes the usual inner race mounted upon the crankshaft 2, rollers bearing thereabout and outer race bearing on the rollers. The outer race is fitted within the suitable annular seat indicated within the bearing member 6.

It will be apparent thus far that the bolts 7 will be liable to shearing stresses imposed by the connecting rod 3 (and any other rods on the crankshaft) unless the fit of the bearing member or housing 6 is perfect within the base member 5. Such a fit has been practically impossible of attainment heretofore, and consequent looseness at the bolts 7 has been found to develop in operation.

My invention is directed to overcoming such difficulty and pertains primarily to the base or ring member 5. According to the invention, I cut away a portion of the ring member. The longitudinal extent of the cut appears in Figs. 1 and 3 and its circumferential extent is approximately that of a quadrant, as best appears in Fig. 2. Also as there appears, the cut terminates along non-radial lines to provide a pair of faces 5a in planes intersecting the central opening on opposite sides of the axis thereof.

At each face 5a I provide a wedge block 9 having a face cooperative therewith, and a radially inner face 9a effectively in continuation of the inner cylindrical surface of the member 5. Thru each wedge block 9, I provide a bolt 10 generally tangentially disposed having a cylindrical shank portion extending thru the wedge block and into the member 5, and threaded at its extremity into the latter.

It will be apparent that by the arrangement described, tightening of the bolts 10 will cause the faces 9a of the wedge blocks to exert radially inner forces as indicated by the arrows Fig. 2, by cooperation of the inclined faces at 5a; the bolts 10 being stressed neither in pure shear or in pure tension, but rather in a combination thereof of lesser amount than commensurate with the forces indicated by the arrows.

As above stated and as appears Fig. 2, the circumferential disposition of the parts is such that the resultant clamping forces at the wedge blocks will be separated 90° apart. According to the invention I so dispose the circular member 5 in the side frame member 1 that one of the wedge blocks 9 exerts its clamping force upon the bearing member 6 opposite the maximum thrust exerted by the connecting rod 3 or rods on the crankshaft 2, and the other wedge block vertically above the crankshaft center line as appears Fig. 1. Thus the clamping points upon the member 6 are disposed for greatest effectiveness relative to the connecting rod reactions.

The embodiment illustrated contemplates welded steel construction. According to my invention, given the member 5 as a simple ring, its quadrantal portion may be cut out therefrom by torch operations in three planes, and the wedge blocks subsequently cut off from the ends of the removed quadrant.

I claim:

1. In a machine of the class described and having a side frame member, a crankshaft, and bearing means therefor including a circular member: means for removably mounting said crankshaft bearing member in said side frame member and including a base member rigidly associated with said side frame member and having a circular opening to fit about said bearing member, said base member having an arcuate portion cut away to provide a face toward said opening, in a plane intersecting said opening parallel to the axis thereof, a wedge block having a face cooperative with said base member face and a surface effectively in continuation of that of said opening, and bolt means securing said wedge block to said member and disposed obliquely relative to said corresponding faces; whereby radial force may be exerted by said wedge block upon said crankshaft bearing member by tightening of said bolt means, in greater amount than either the tension or shearing forces on said bolt means.

2. In a machine of the class described and having a side frame member, a crankshaft, and bearing means therefor including a circular member: means for removably mounting said crankshaft bearing member in said side frame member and including a base member rigidly associated with said side frame member and having a circular opening to fit about said bearing member, said base member having an arcuate portion cut away to provide a pair of faces toward said opening, in planes intersecting said opening on opposite sides of the axis thereof, a pair of wedge blocks having faces cooperative with said base member faces and surfaces effectively in continuation of that of said opening, and bolt means securing said wedge blocks to said base member and disposed obliquely relative to their said corresponding faces.

3. In a machine of the class described and having a side frame member, a crankshaft, and bearing means therefor including a circular member: means for removably mounting said crankshaft bearing member in said side frame member and including a base member rigidly associated with said side frame member and having a circular opening to fit about said bearing member, said base member having a quadrant portion cut away to provide a pair of faces toward said opening, in planes intersecting said opening on opposite sides of the axis thereof, a pair of wedge blocks having faces cooperative with said base member faces and surfaces effectively in continuation of that of said opening, and bolt means securing said wedge blocks to said base member and disposed obliquely relative to their said corresponding faces, said quadrant portion being so disposed that said wedge block surfaces will bear on said circular bearing member at location of greatest reaction thereon.

4. In a machine of the class described and having a side frame member, a crankshaft, and bearing means therefor including a circular member: means for removably mounting said crankshaft bearing member in said side frame member and including a base member rigidly associated with said side frame member and having a circular opening to fit about said bearing member, said base member having an arcuate portion cut away to provide a face toward said opening, in a plane intersecting said opening parallel to the axis thereof, a wedge block having a face cooperative with said base member face and a surface effectively in continuation of that of said opening, and bolt means securing said wedge block to said member and disposed obliquely relative to said corresponding faces, for the purpose said bolt means having cylindrical bearing in said wedge block and in said member thereadjacent, and threaded connection with said member therebeyond.

5. In a machine of the class described and having a side frame member, a crankshaft, and bearing means therefor including a circular member: means for removably mounting said crankshaft bearing member in said side frame member, and including a base member rigidly associated with said side frame member and having a circular opening to fit about said bearing member, said bearing member having a cylindrical portion within said opening and a peripheral flange portion thereadjacent, circumferentially spaced bolts securing said flange to said base member, said base member having an arcuate portion cut away to provide a face toward said opening, in a plane intersecting said opening parallel to the axis thereof, a wedge block having a face cooperative with said base member face and a surface effectively in continuation of that of said opening, and bolt means securing said wedge block to said member and disposed obliquely relative to said corresponding faces.

CLEMENT B. KLUPPEL.